UNITED STATES PATENT OFFICE.

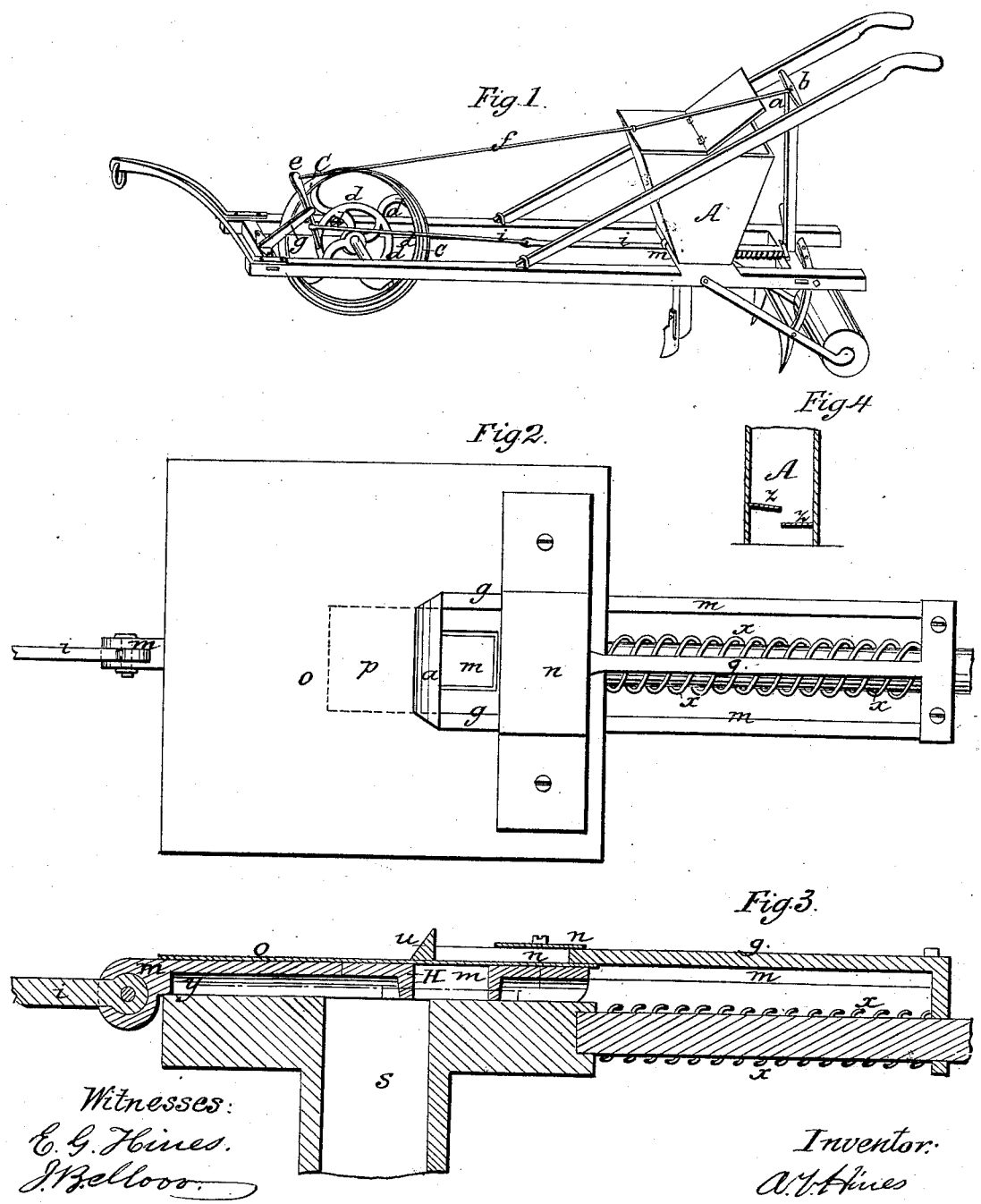

ABRAHAM F. HINES, OF WASHINGTON, DISTRICT OF COLUMBIA.

IMPROVEMENT IN CORN-PLANTERS.

Specification forming part of Letters Patent No. 50,246, dated October 3, 1865.

*To all whom it may concern:*

Be it known that, I ABRAHAM F. HINES, of the city of Washington, county of Washington, District of Columbia, have invented certain new and useful Improvements in Seed or Corn Planters; and I do hereby declare that the following is a full, clear, and exact description of the construction and operation of the same, reference being had to the accompanying drawings, making a part of this specification, in which—

Figure 1 represents a perspective view of the seed or corn planter; Fig. 2, a plan of the two slide-valves; Fig. 3, a longitudinal section of same; Fig. 4, a transverse section of the hopper.

Similar letters of reference denote like parts in all the drawings.

The nature of my invention consists in the arrangement of two slide-valves, in combination with a rod attached to a lever on which one, two, or more pins are working in rotation. When a pin slips off and the lever returns to its original position the rod attached to it will pull the valve-slides forward over the spout, through which the seed or grain in the valve will drop down and fall on the ground. A plate fastened over the under slide-valve will allow but a certain quantity of seed or grain to escape through the under valve and spout or seed-duct. A spring is placed between the outside of the spout and the end piece of the valve in order to force back the slide-valves to their original position, and at every such movement the projection on the end of the upper slide-valve will feed the lower valve. The lever is supported by an arm fixed on the frame of the seed or corn planter, and at the top of the lever is attached a wire or rod, which passes through an eye fixed on the hopper. At the end of said wire or rod is attached a rubber or other spring to be hooked onto a cross-piece between the handles of the planting-machine, whereby the lever is kept in its working position and the machine ready to be put in operation. When the operator does not want the machine to drop the seed he has but to unhook the rubber or spring, and the seed or grain in the hopper will not then escape.

To enable others skilled in the art to make and use my invention, I will proceed to describe its construction and operation.

I construct in the bottom of hopper A two slide-valves, placed as shown in Figs. 2 and 3. When the hopper is filled with seed or grain and the machine is to be worked hook on the spring or rubber $a$ on hook $b$. (See Fig. 1.) The machine being pulled forward, the wheel $c$ will revolve and cause pins $d\ d\ d$, fixed on the inner ring of wheel $c$, to strike and vibrate the lever $e$. When a pin slips off the lever will be pulled back to its original position by wire or rod $f$. The pivot of the lever is on the arm $g$, said arm being fixed on the frame of the planting-machine. Below its pivot, at the other end of the lever $g$, is attached a rod, $i$, which consists of two or more pieces, and is connected with slide-valve $m$, which works in a groove in the bottom of the hopper A.

Figs. 2 and 3 show the plan and longitudinal section of the two slide-valves $q$ and $m$. The plates $n$ and $o$ (of brass or any other suitable metal) keep the slides in their proper places. In plate $o$ is a hole, $p$, through which the upper slide-valve, $q$, feeds the under valve, $m$. When a pin slips off the lever the rod $i$ will move by means of spring $x$ toward the hopper, and the slide-valves move in the same direction, whereby the projection $u$ on the end of the upper valve, $q$, will feed the valve $m$. In passing over the hole in plate $o$ the seed or grain from the hopper will fill valve $m$, and the valves again being pulled forward, the plate $o$ will prevent more seed or grain to fall out on the ground through spout $s$ than the aperture of under valve, $m$, can contain. The spring $x$ serves to push back the slides to their original position. The main advantage of this simple arrangement of the two slide-valves in combination with rods, lever, &c., is that the same quantity of seed or grain is always planted and at the same distance from each other, that the valves are not liable to be clogged up by any undue accumulation of seed or grain, and that the operator at his own discretion can determine the space between the seed to be planted by supplying the inner ring of wheel, $c$, with more or less pins.

The above-described corn or seed planter may be connected with a cultivator-tooth, drags to cover the corn or other seed, or a roller, as shown in Fig. 1.

In hopper A, I have constructed two shelves, $z\ z$, in order to prevent any undue pressure of the seed in the hopper on the slide-valves. Said shelves may be made of wood, or any suitable metal, and are slanting inward, that the seed at the least motion of the machine may fall off. (See Fig. 4.) The red lines in Fig. 3 indicate that frames with different-sized apertures can be used, said frames to be removed at the option of the operator.

This machine may be made to plant a plurality of rows when placed on a suitable frame.

What I claim as my invention, and desire to secure by Letters Patent, is—

1. Slide-valve $q$, rod $i$, and spring $x$, in combination with valve $m$, plates $n$ and $o$, spout or seed duct $s$, groove $y$, and frames H in valve $m$.

2. Rubber or spring $a$, rod F, in combination with lever E and the inner ring of wheel $c$, provided with pins $d\,d\,d$ to operate on the lever.

3. The arrangement of two or more shelves in hopper, said shelves standing inward, that the corn or other seed in hopper at the least motion of the machine will fall off into the bottom of the hopper, the whole constructed and operated in the manner and for the purposes herein set forth.

A. F. HINES.

Witnesses:
 E. G. HINES,
 J. B. MOORE.